United States Patent [19]
Takahashi et al.

[11] Patent Number: 5,599,040
[45] Date of Patent: Feb. 4, 1997

[54] BAG FOR AIR BAG SYSTEM AND MANUFACTURING METHOD THEREOF

[75] Inventors: Hiroyuki Takahashi, Aichi-Ken; Makoto Hamada, Toyota; Hiroyuki Kobayashi, Bisai, all of Japan

[73] Assignees: Toyota Jidosha Kabushiki Kaisha, Toyota; Toyoda Goesei Co., Ltd., Aichi-ken, both of Japan

[21] Appl. No.: 457,277

[22] Filed: Jun. 1, 1995

[30] Foreign Application Priority Data

Jun. 9, 1994 [JP] Japan .................................. 6-127626

[51] Int. Cl.[6] .................................................. B60R 21/24
[52] U.S. Cl. ........................................ 280/729; 280/743.1
[58] Field of Search .............................. 280/729, 743.1, 280/743.2

[56] References Cited

U.S. PATENT DOCUMENTS

| | | | |
|---|---|---|---|
| 4,243,248 | 1/1981 | Scholz et al. .......................... | 280/735 |
| 5,280,954 | 1/1994 | Henseler et al. ....................... | 280/743.1 |
| 5,358,273 | 10/1994 | Onishi et al. .......................... | 280/729 |
| 5,454,595 | 10/1995 | Olson et al. ........................... | 280/729 |

FOREIGN PATENT DOCUMENTS

| | | | |
|---|---|---|---|
| 0553542 | 8/1993 | European Pat. Off. . | |
| 2-71051 | 5/1990 | Japan . | |
| 3-67748 | 3/1991 | Japan . | |
| 3-136945 | 6/1991 | Japan .................................. | 280/743.1 |
| 3-182854 | 8/1991 | Japan .................................. | 280/743.1 |
| 6-72267 | 3/1994 | Japan .................................. | 280/743.2 |
| 2257950 | 1/1993 | United Kingdom . | |

*Primary Examiner*—Paul N. Dickson
*Attorney, Agent, or Firm*—Oliff & Berridge

[57] ABSTRACT

A method of manufacturing a bag for an air bag system has the steps of (a) securing together a first base cloth having a gas inlet and a second base cloth along a periphery thereof, (b) forming a main bag and at least one auxiliary bag so that the at least one auxiliary bag is located between the main bag and the periphery, and (c) turning the first base cloth and the second base cloth inside out via the gas inlet. A bag is provided by the method and has a main bag and at least one auxiliary bag as component parts.

13 Claims, 7 Drawing Sheets

BAG FOR AIR BAG SYSTEM AND MANUFACTURING METHOD THEREOF

BACKGROUND OF THE INVENTION (1) Field of the Invention

The present invention generally relates to a bag for an air bag system for a vehicle and a method of manufacturing the same and, more particularly, to a bag for an air bag system which has an auxiliary bag for controlling the shape of a main bag during inflation of the main bag.

(2) Description of the Related Art

In the field of automobile technology, an air bag system is well known as a system for restraining a driver or a passenger. The air bag system inflates a bag between the driver and the steering wheel when a deceleration exceeding a given threshold level is exerted on the automobile. Thus, a body of a driver or a passenger is restrained when a automobile is abruptly decelerated.

It is required that the bag be suitably inflated to restrain the driver without any failure. Especially, shapes of the bag during the inflation thereof are very important to control movements of the driver appropriately.

Therefore, a bag which has an auxiliary bag inflating at the end of the inflation of the main bag has been used in a conventional air bag system as disclosed in Japanese Laid-open Patent Application No. 3-7748.

The bag disclosed in the above application has an underside base cloth and an upperside base cloth. The underside base cloth has an inlet for gas supplied from an inflater placed at the center of a steering wheel. The upperside base cloth has auxiliary bags made from sections of the upperside base cloth.

The auxiliary bags are turned into the reverse side of the upperside base cloth. More particularly, the auxiliary bags are turned in so that they start their inflation when stresses exerted thereon increase to a predetermined level which occurs at the end of the inflation of the main bag. Thus, the bag is inflated with a volume not including the volume of the auxiliary bags at the beginning of the inflation. Thereafter, it is inflated as a bag which has a volume including the volume of the auxiliary bags.

That is, the size of the bag is sequentially changed during the two levels of the inflation process. As a result, it is possible to realize both arranging the shape of the bag appropriately in the beginning of the inflation and securing a sufficient volume for restraining the driver without any failure at the end of the inflation.

The conventional bag is manufactured as follows. First, auxiliary bags are made by turning sections of the upperside base cloth into the reverse side thereof and stitching the upperside base cloth at the base of the sections so that the stitched portions have an appropriate strength. Then, the upperside base cloth and the underside base cloth are stacked so that the reverse sides thereof are in contact with each other. Thereafter, main bag is made by stitching the upperside base cloth and underside base cloth together along their periphery.

In the above manufacturing method, it is necessary to form the auxiliary bags before stitching the upperside base cloth and the underside base cloth together. This is because the auxiliary bags are made from sections of the upperside base cloth which should be located interiorly of the main bag. Thus, in the conventional method, it is not possible to form the main bag and the auxiliary bag at the same time.

SUMMARY OF THE INVENTION

It is a general object of the present invention to provide a novel and useful manufacturing method of a bag for an air bag system and an air bag system for use in an automobile.

A more specific object of the present invention is to provide a manufacturing method by which a main bag and a auxiliary bag can be made in the same process.

A further object-of the present invention is to provide a bag for an air bag system which can easily be made and can restrain a driver without failure in a collision.

The above-mentioned objects of the present invention are achieved by a method of manufacturing a bag for an air bag system, the method comprising the steps of;

(a) securing together a first base cloth having a gas inlet and a second base cloth along a periphery thereof;

(b) forming a main bag and at least one auxiliary bag so that said at least one auxiliary bag is located between said main bag and said periphery; and (c) turning the first base cloth and the second base cloth inside out via the gas inlet.

According to the present invention, it is easy to form the main bag and the auxiliary bag at the same time. Therefore, using this method, it will be possible to increase the production of the bags for use in an air bag system.

The above-mentioned objects of the present invention are also achieved by a bag for an air bag system comprising;

a main bag having a gas inlet and defined by secured portions which connect a first base cloth and a second base cloth; and at least one auxiliary bag located interiorly of the said main bag and defined by secured portions which connect said first base cloth and said second base cloth.

The above-mentioned objects of the present invention are also achieved by an air bag system comprising:

deceleration detecting unit detecting a deceleration exerted on an automobile;

a control unit generating a control signal when said deceleration detecting unit detects a deceleration larger than a predetermined level;

a gas releasing unit releasing a gas when it receives said control signal; and a bag including a main bag having a gas inlet and defined by secured portions which connect a first base cloth and a second base cloth, and at least one auxiliary bag located interiorly of the said main bag and defined by secured portions which connect said base cloth and said second cloth.

Other objects, features and advantages of the present invention will become more apparent from the following detailed description when read in conjunction with the accompanying drawings.

DESCRIPTION OF THE PREFERRED EMBODIMENTS

A description will be given, with reference to FIG. 2 through FIG. 5, of a bag for an air bag system according to a first embodiment of the present invention.

Figure 1:
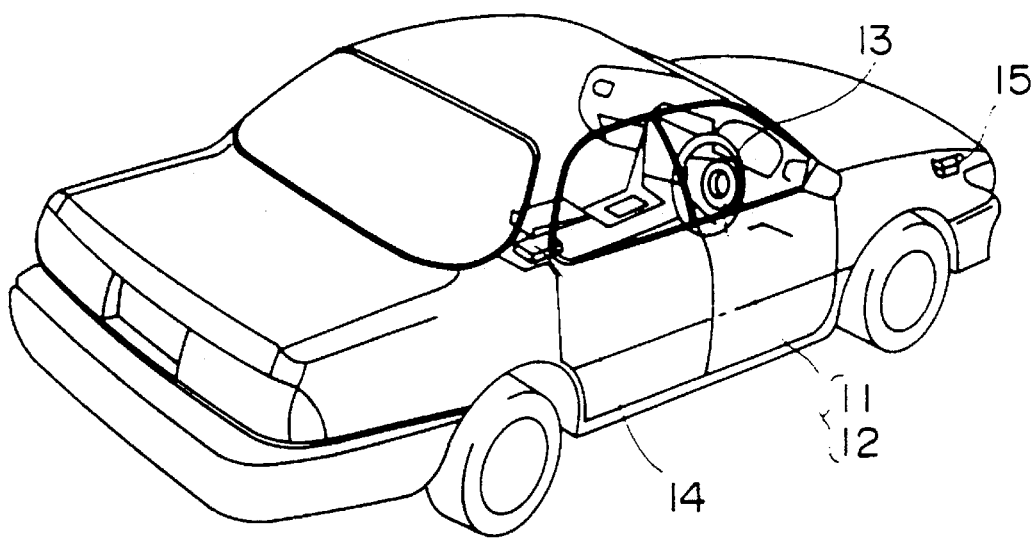
FIG. 1 is a perspective view of an air bag system according to a first embodiment of the present invention.

FIG. 1 is a perspective view of an air bag system 10. The air bag system 10 shown in FIG. 1 has an inflater 11 and a bag 12 placed in the center portion of a steering wheel 13. The air bag system 10 also has an electrical control unit 14 and a deceleration sensor 15.

Figure 2:
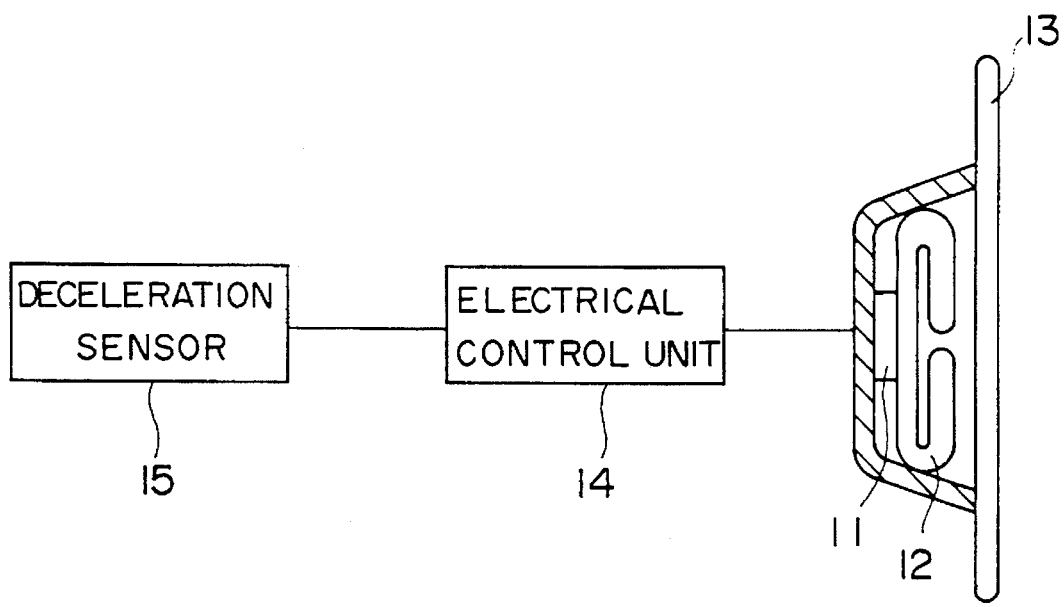
FIG. 2 is a block diagram of an air bag system according to a first embodiment of the present invention.

FIG. 2 is a block diagram of the air bag system 10. As shown in FIG. 2, the deceleration sensor 15 is connected with the electrical control unit 14. The electrical control unit 14 is connected with the inflater 11.

The deceleration sensor 15 detects a deceleration exerted on the automobile. The electrical unit 14 detects a collision of an automobile in accordance with deceleration signals supplied by the deceleration sensor 15. When a deceleration larger than a predetermined level is detected by the deceleration sensor 15, the electrical control unit 14 judges that a collision of an automobile has occurred, and generates a control signal for operating the air bag system 10. The inflater 11 releases a gas when it receives the control signal. Thus, the bag 12 is inflated by the gas.

Figure 3:
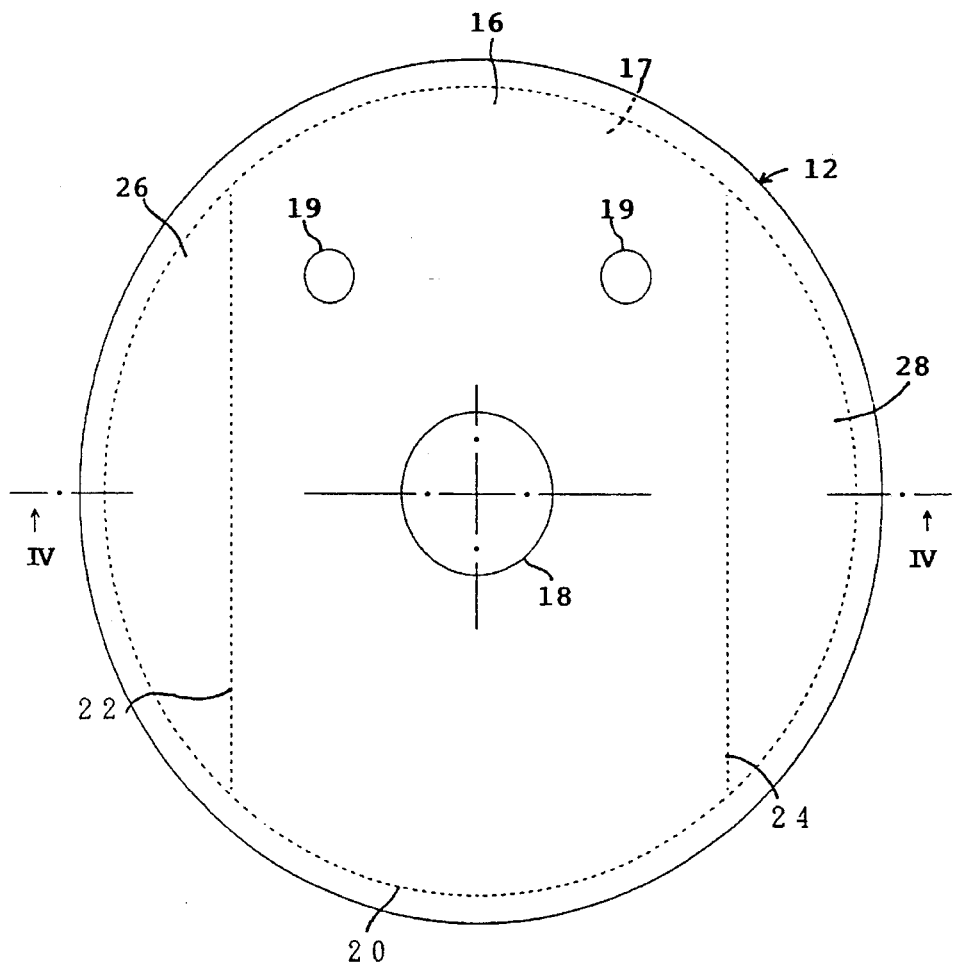
FIG. 3 is a plan view showing a reversed state of a bag according to a first embodiment of the present invention.
Figure 4:
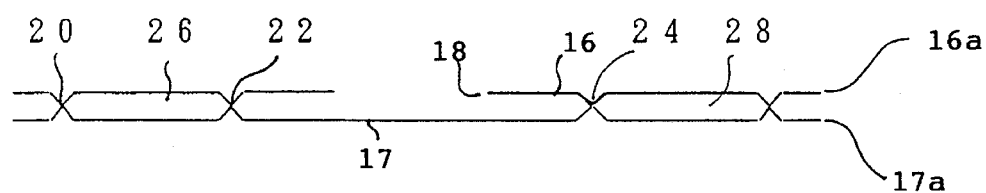
FIG. 4 is a cross-sectional view taken along a line IV—IV shown in FIG. 3.

FIG. 3 shows an underside base cloth 16 and an upperside base cloth 17 stacked so that the respective front sides are in contact each other. FIG. 4 shows a cross-sectional view taken along a line IV-IV in FIG. 3. The bag 12 of the present embodiment includes the underside base cloth 16 and the upperside base cloth 17. The underside base cloth 16 and the upperside base cloth 17 are made of, for example, nylon or polyester. The reverse sides of the cloths 16 and 17 are coated with a heat-resistant rubber. The underside base cloth 16 has a gas inlet 18, which receives the inflating gas when the air bag system is operated. The underside base cloth 16 also has two gas outlets 19 through which the gas supplied to the bag 12 may flow out and permit the bag to deflate.

More particularly, FIG. 3 and FIG. 4 show the structure of the air bag during an intermediate step in is the manufacturing method and which is after completing the steps of forming a body of the bag 12 and forming auxiliary bags in the process of manufacturing the bag 12. First, the underside base cloth 16 and the upperside base cloth 17 are stitched together along a line 20 substantially concentric to the inlet 18 along a periphery of the cloths 16 and 17. The stitch line 20 has sufficient resistance against tension exerted thereon to remain intact when the air bag system is actuated and the air bag is filled with gas. Thus, the two cloths 16 and 17 remain stitched together.

After the above stitching step is completed, the underside base cloth 16 and the upperside base cloth 17 are also stitched together along lines 22 and 24. The stitch lines 22 and 24 are positioned so as to be substantially parallel. Each end of each stitch lines 22 and 24 intersects the stitch line 20. Thus, in the intermediate step shown in FIG. 2, the stitch line 20 is substantially circular and the stitch line 22 and 24 intersect the stitch line 20 so as to define first and second substantially arc-shaped auxiliary bags 26 and 28.

The stitch lines 22 and 24 are less resistant to the force exerted by the gas than the stitch line 20. The stitch lines 22 and 24 are broken when the tension exerted thereon becomes greater than a predetermined level in the inflation process of the bag 12. When the above stitching step is completed, the bag 12 is in the reverse state as compared to the state of the bag 12 when it is inflate. The cloths 16 and 17 form the aforementioned bag body. Further, auxiliary bags 26 and 28 are defined by the stitch line 20 and the stitch lines 22 and 24.

Figure 5:
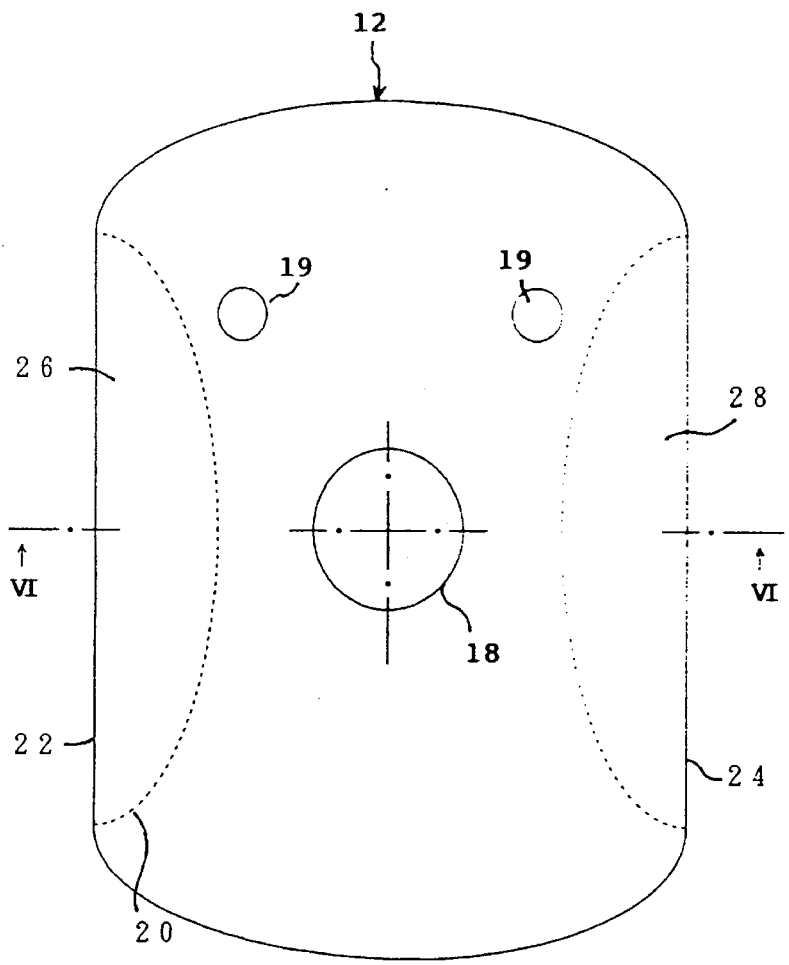
FIG. 5 is a plan view showing the original state of the bag according to the first embodiment of the present invention.
Figure 6:
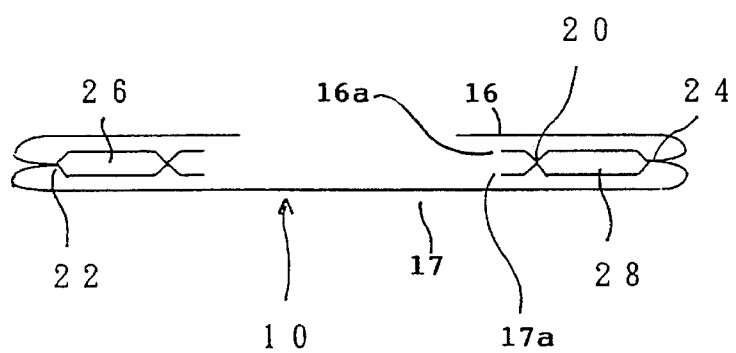
FIG. 6 is a cross-sectional view taken along a line VI—VI shown in FIG. 5.

Then, the step of changing the bag 10 to the original state, i.e., the state the bag is in when actuation of the air bag system occurs, is carried out. More particularly, the cloths 16 and 17 are turned inside out by pulling the cloth 17 through the gas inlet 18. FIG. 5 shows the original state of the bag 12 after the reversal step described above. FIG. 6 is a cross-sectional view taken along a line VI—VI in FIG. 5.

Thus, as shown in FIG. 6, the bag 12 has the auxiliary bags 26 and 28 located interiorly of where the stitch line 20 is located. In this case, the outer edges 16a, 17a of the underside base cloth 16 and the upperside base cloth 17 are located within the bag 12 with the auxiliary bags 26 and 28 and closer to the gas inlet 18 than the auxiliary bags 26 and 28.

Thereafter, the bag 12 thus formed is folded in a suitable size. Then, the folded bag 12 is set in, for example, the center of the steering wheel 13 with the gas inlet 18 connected to the inflater 11 also provided in the steering wheel 18.

When an inflating gas is supplied to the bag 12 from the inflater 11, the bag 12 starts inflating. At the beginning of the inflation, the auxiliary bag 26 and 28 do not expand due to the resistance of the stitch lines 22 and 24. Therefore, the volume of the bag 12 measured at the beginning of the inflation is equal to a volume obtained by subtracting the volume of the auxiliary bags 26 and 28 from the whole volume of the bag 12.

As has been stated, it is possible to more easily control the shape of the bag 12 during the initial stage of inflation when the volume of gas in the bag 12 is smaller. It is preferable that the bag 12 has a relatively small volume during the initial stage of the inflation to restrain the driver precisely. On the other hand, it is desirable that the bag 12 has a relatively large volume to prevent various type and degree of forces from various directions being exerted on the driver.

In order to effectively and efficiently satisfy the above antithetical requirement, the auxiliary bags 26 and 28 are formed and positioned interiorly of the bag 12 as has been previously described with the stitch lines 22 and 24 being less than that of the stitch line 20.

A description will now be given of the reason why the bag 12 is first formed in the reversed state, and then turned inside out so that the edges of the underside base cloth 16, the upperside base cloth 17, and the auxiliary bags 26 and 28 are positioned interiorly of the bag 12.

The bag 12 is a component of the air bag system which instantaneously inflates the bag. Thus, when the edges of the underside base cloth 16 and the upperside base cloth 17 are initially coming out of the bag 12, a large amount of friction between the steering wheel and the edges would occur when the air bag system 10 is inflated. The friction is not favorable to efficient operation of the air bag. In order to reduce friction, the edges of the underside base cloth 16 and the uppreside base cloth 17 should be located within the bag 12.

Figure 7:
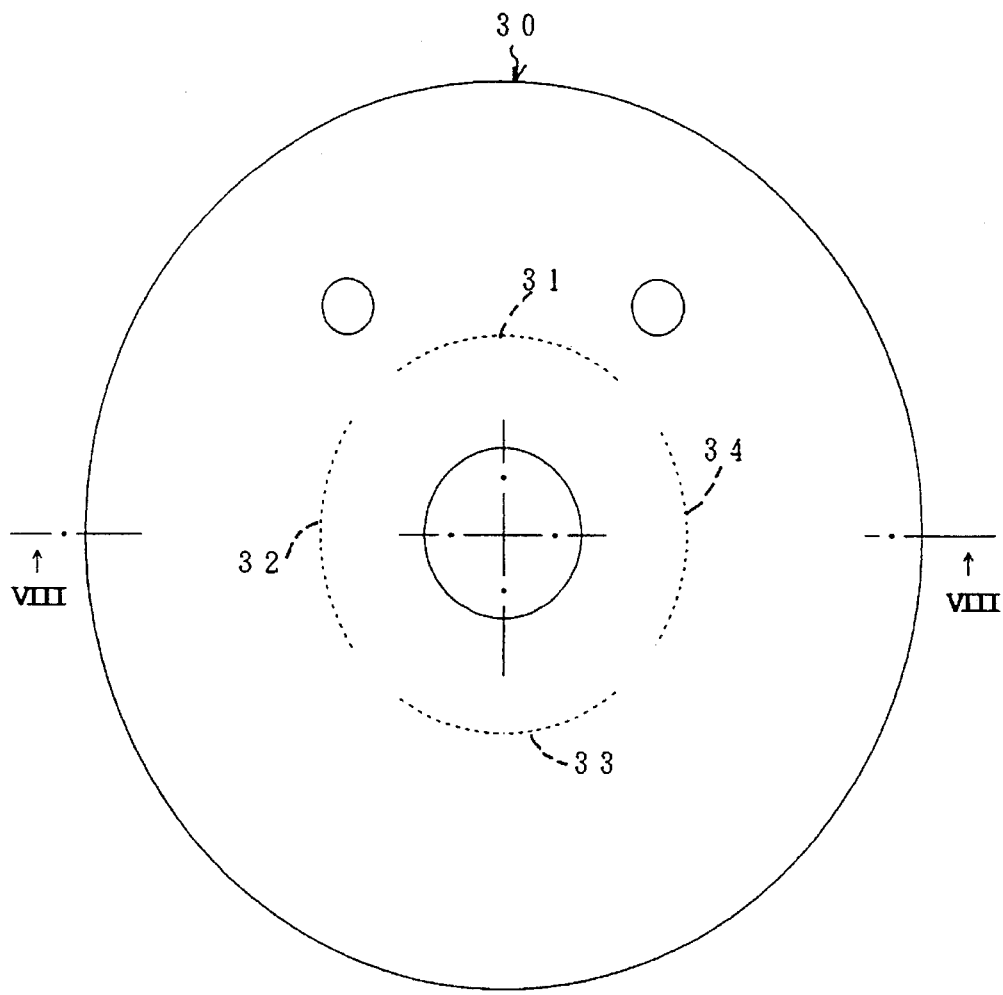
FIG. 7 is a plan view showing a reversed state of a conventional bag.
Figure 8:
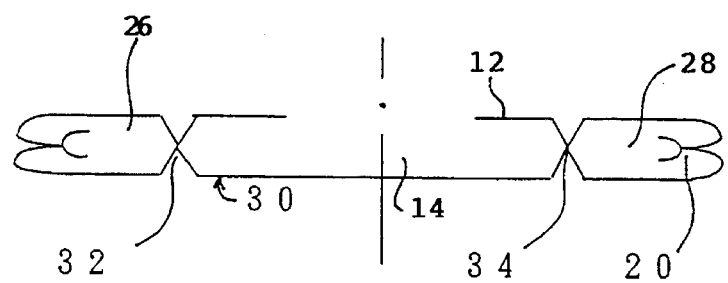
FIG. 8 is a cross-sectional view taken along a line VIII—VIII shown in FIG. 7.

FIG. 7 and FIG. 8 show a prior art bag 30. The edges of the underside base cloth 16 and the upperside base cloth 17 are located within the bag 30, while the auxiliary bags 26 and 28 are exposed. With regard to the aforementioned requirements, i.e., reducing friction, it can be said that the bag 30 is satisfactory for an use in air bag system.

However, to make the structure of the bag 30, it is necessary to form the stitch line 20 first, and then to form the stitch lines 32 and 34 after turning the bag 30 inside out. Therefore, it is impossible to form the stitch line 20 and the stitch lines 22 and 24, as in the manufacture of the bag 12, at the same time in the manufacturing process of the bag 30. On the other hand, in the manufacturing method of the bag 12 according to the present embodiment, it is possible to form the stitch line 20 and the stitch lines 22 and 24 at the same time. For the foregoing reason, it follows that the bag 12 of the present embodiment can provide for increased production over the bag 30 shown in FIG. 7 and FIG. 8.

Figure 9:
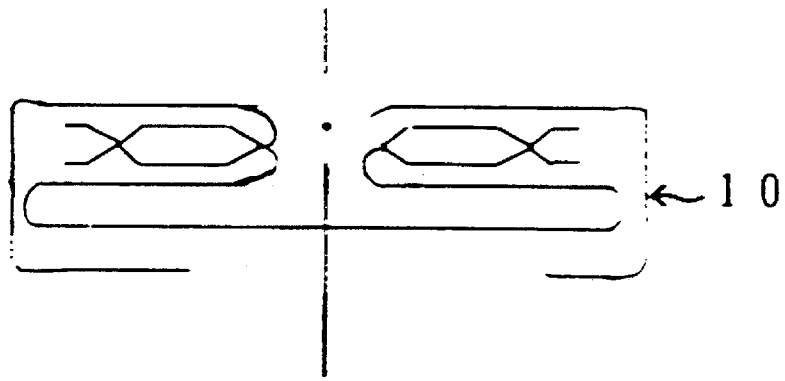
FIG. 9 is a cross-sectional view showing a folded state of the bag according to the first embodiment of the present invention.
Figure 10:
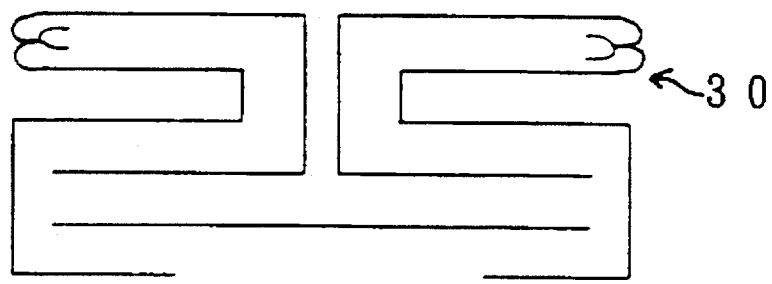
FIG. 10 is a cross-sectional view showing a folded state of the conventional bag shown in FIG. 7 and 8.

The bag 12 must be folded in a suitable size to install it in the automobile, for example, in the steering wheel 13. FIG. 9 shows an installed state of the bag 12, and FIG. 10 shows an installed state of the bag 30. As shown in FIG. 9, the bag 12 can be folded in a suitable size by folding it once. On the other hand, as shown in FIG. 10, it is necessary to fold the bag 30 twice to reduce it to suitable size. This means that the bag 12 of the present embodiment can be more quickly installed in the automobile so as to provide increased production when compared to the bag 30 in the installing process.

In the manufacturing method of the present embodiment, the first step—the step of forming the stitch line 20, and the second step—the step of forming the stitch lines 22 and 24, are both performed when the cloths 16 and 17 are arranged in stacked form. Thus, the first and second steps can be processed on the same work table.

In this regard, the first embodiment of the present invention is advantageous to the conventional method in which the step of forming the auxiliary bags must be performed after the main bag is formed. Hence, manufacture of the present invention in superior, for increasing production, to that of the conventional method.

Though the stitch lines 22 and 24 are formed after forming stitch line 20 in the description given previously, the present embodiment is not limited to the above sequence. For example, it is possible to form the stitch line 20 after forming the stitch lines 22 and 24 or to form the stitch line 20 and the stitch lines 22 and 24 simultaneously.

Further, although stitching has been described as a means for joining or securing the underside base cloth 16 and the uppreside base cloth 17 together, the invention is not limited to stitching. For example, bonding or welding can be used instead of stitching.

Incidentally, as has been described previously, it is necessary to differentiate between the strength of the stitch line 20 and the strength of the stitch lines 22 and 24 to ensure the proper function of the bag 12. When using stitching to join the cloths, the stitch line 20 is formed, for instance, by a thread having a strength different from the strength of a thread used to form stitch lines 22 and 24. When bonding or welding is used, different bonding conditions or welding conditions are set so as to provide a strength differential.

Figure 11:
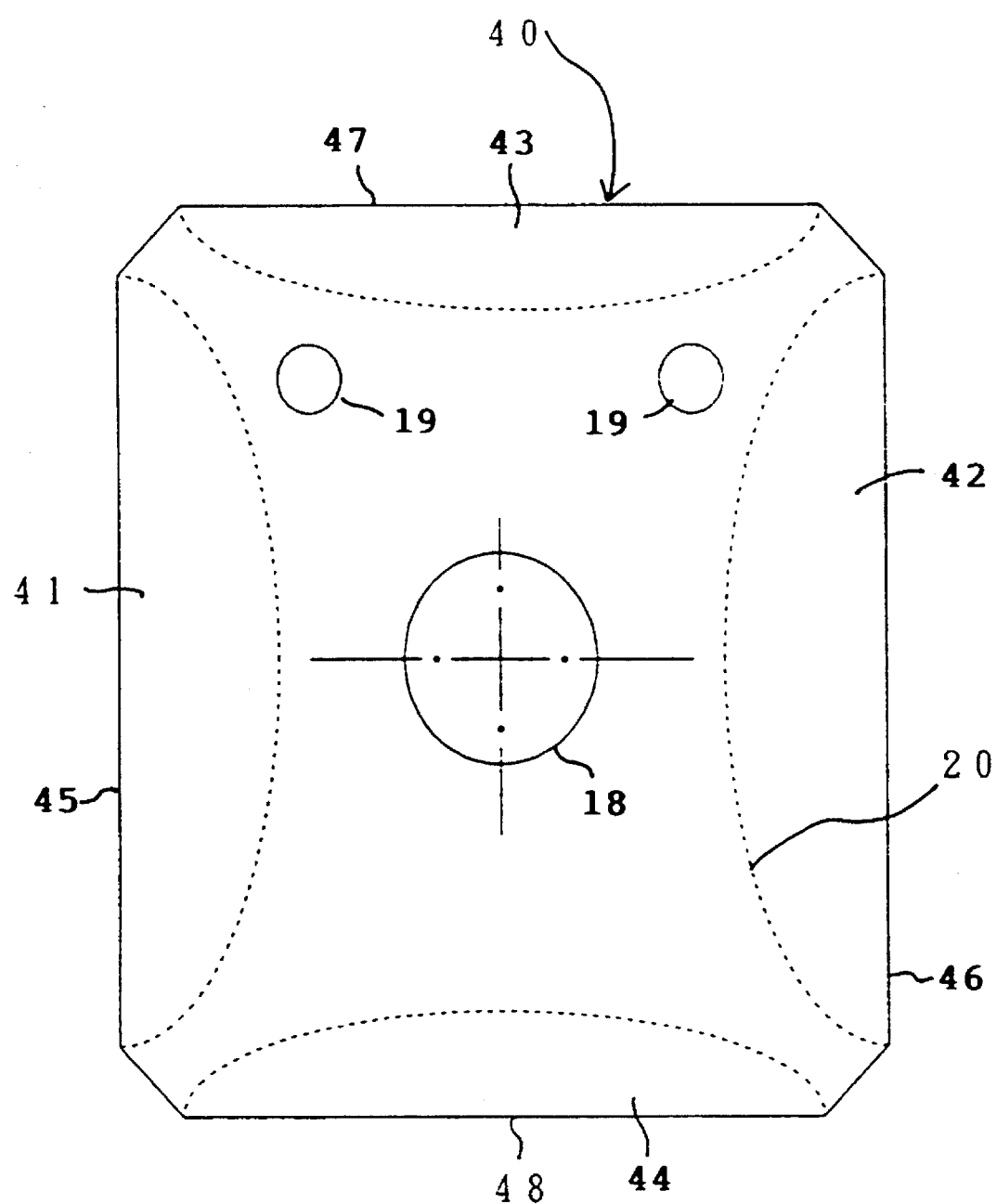
FIG. 11 is a plan view showing a bag according to a second embodiment of the present invention.

FIG. 11 shows a plan view of a bag 40 which has a gas inlet 18 in the center thereof and four auxiliary bags 41, 42, 43 and 44 around the gas inlet 18. The bag 40 shown in FIG. 10 can be structured by forming four stitch lines 45, 46, 47 and 48 instead of forming two stitch lines 22 and 24. In this case, since four auxilary bags 41, 42, 43 and 44 are located within the bag 40, the bag 40 is smaller than the bag 12. Thus, the folding process of the bag 40 is easier than that of the bag 12.

Figure 12:
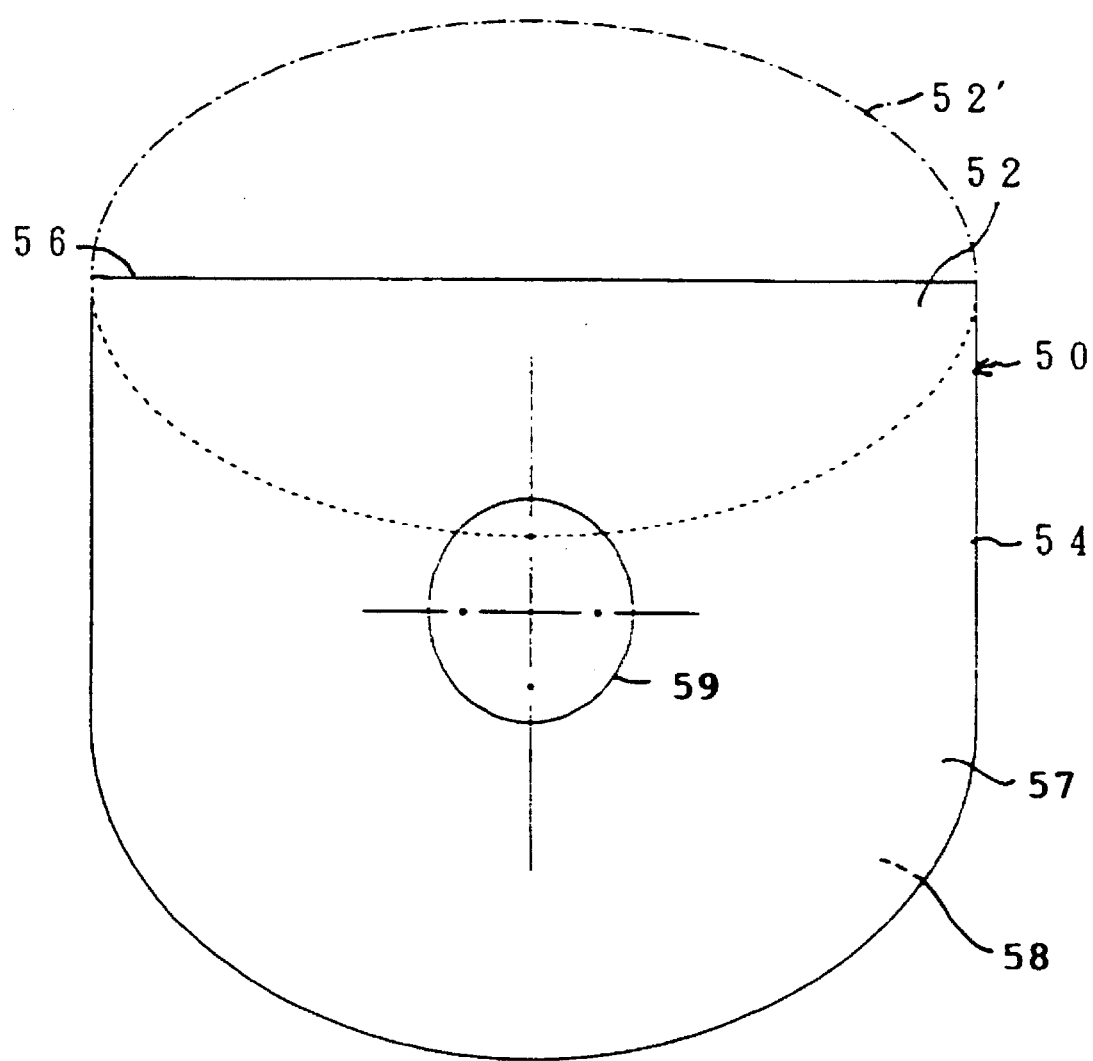
FIG. 12 is a plan view showing a bag according to a third embodiment of the present invention.

FIG. 12 shows a plan view of a bag 50 manufactured by a manufacturing method according to another embodiment of the present invention. The shape drawn with a dotted line indicates the edge of the auxiliary bag 52 which is located interiorly of the bag 50. A shape 52' drawn with alternate long and short dash lines indicates the edge of the auxiliary bag 52 when it is in the inflated state.

The bag 50 has a comparatively larger volume than the bag 12. A stitch line 54 forming the edges of the bag 50 and a stitch line 56 separating the auxiliary bag 52 from a main portion of the bag 50 are made so that the main portion of the bag 50 has a volume almost the same as that of the bag 12 shown in FIG. 3.

Therefore the bag 50 inflates almost the same way as the bag 12 at the beginning of the inflation. As the gas pressure in the bag 50 reaches a threshold value, the auxiliary bag 52 starts expanding. As a result, the bag 50 has an increased volume which is larger than that of the bag 12 at the end of the inflation. With the bag 50, it becomes possible to more effectively restrain the occupants of the automobile in the end stage of the inflation.

Because the bag 50 has a sufficient volume after expanding, it is not necessary to provide the bag 50 with a gas outlet such as shown in FIG. 3. Thus, use of the bag 50 facilitates production and avoids a situation in which gas leaks out to the interior of the vehicle.

Incidentally, the bag 50 is manufactured as follows. First, the underside base cloth 57 and the upperside base cloth 58 are stitched together along a periphery of the cloths 57 and 58 so that a stitch line 54 is formed. After that, the underside base cloth 57 and the upperside base cloth 58 are also stitched together so that the stitch line 56 is formed. Then, the underside base cloth 57 and the uppreside base cloth 58 are turned inside out by pulling the cloth 58 through the gas inlet 59.

By modifying the above manufacturing method, it is easy to provide the bag 50 with another auxiliary bag. That is, in the above manufacturing method, if another stitch line stitching together the cloths 57 and 58 and intersecting the stitch line 54 at the both end thereof is formed along with the stitch line 56, another auxiliary bag is easily provided with the bag 50.

The another auxiliary bag may appropriately control the shape of the bag 50 in the initial stage of the inflation of the bag 50 like the auxiliary bags 26, 28 shown in FIG. 5. Thus, if the bag 50 has such another auxiliary bag, the safety of the automobile at the initial stage of inflation of the bag 50 can be more improved.

The present invention is not limited to the specifically disclosed embodiments, and variations and modifications may be made without departing from the scope of the present invention.

What is claimed is:

1. A method of manufacturing a bag for an air bag system, said method comprising the steps of:

(a) securing together a first base cloth having a gas inlet and a second base cloth along a periphery thereof after stacking said first base cloth and said second base cloth so that said periphery has a first rupture strength;

(b) forming a main bag and at least one auxiliary bag immediately after securing together said first base cloth and said second base close along the periphery thereof so that said at least one auxiliary bag is located between said main bag and said periphery and a division between said main bag and said auxiliary bag has a second rupture strength which is less than said first rupture strength; and (c) turning the first base cloth and the second base cloth inside out via the gas inlet after forming said main bag and at least one auxiliary bag so that said at least one auxiliary bag can be located interiorly of said main bag.

2. The method as claimed in claim 1, wherein said securing includes a step of stitching the first and the second base cloths together.

3. The method as claimed in claim 1, wherein said securing includes a step of bonding the first and the second base cloths together.

4. The method as claimed in claim 1, wherein said securing includes a step of welding the first and the second base cloths together.

5. The method as claimed in claim 1, wherein said step (b) includes a step of (b-1) securing the first and the second base cloths together in at least one position inwardly from said periphery so that said at least one position inwardly from said periphery is secured at said second rupture strength.

6. The method as claimed in claim 5, wherein said step (b-1) includes a step of securing the first and the second base cloths together and forming a plurality of auxiliary bags.

7. The method as claimed in claim 5, wherein:

said step (a) includes a step of stitching the first and the second base cloths together by a first thread of a predetermined rupture strength; and said step (b-1) includes a steps of stitching the first and the second base cloths together by a second thread having a predetermined rupture strength less than that of the first thread.

8. A bag for an air bag system comprising:

a main bag having a gas inlet and defined by secured portions which directly connect a first base cloth and a second base cloth and have a first rupture strength; and at least one auxiliary bag located interiorly of said main bag and defined by secured portions which directly connect said first base cloth and said second base cloth and have a second rupture strength which is less than said first rupture strength.

9. The bag as claimed in claim 8, wherein said secured portions are joined by being stitched.

10. The bag as claimed in claim 8, wherein said joined portions are secured by being bonded.

11. The bag as claimed in claim 8, wherein said secured portions are joined by being welded.

12. An air bag system comprising:

deceleration detecting unit detecting deceleration exerted on an automobile;

a control unit generating a control signal when said deceleration detecting unit detects a deceleration larger than a predetermined level;

a gas releasing unit releasing a gas when it receives said control signal; and a bag including a main bag having a gas inlet and defined by secured portions which directly connect a first base cloth and a second base cloth and have first rupture strength, and at least one auxiliary bag located interiorly of said main bag and defined by secured portions which directly connect said first and second base cloths and have a second rupture strength which is less than said first rupture strength.

13. A bag for an air bag system comprising:

a main bag having a gas inlet and defined by first secured portions which directly connect a first base cloth and a second base cloth and have a first rupture strength; and at least one auxiliary bag located interiorly of said main bag and defined by second secured portions which directly connect said first base cloth, said second base cloth and a part of said first secured portions and have a second rupture strength which is less than said first strength.

* * * * *